United States Patent
Kunimi et al.

(10) Patent No.: US 9,197,828 B2
(45) Date of Patent: Nov. 24, 2015

(54) SOLID-STATE IMAGING DEVICE

(71) Applicant: KABUSHIKI KAISHA TOSHIBA, Tokyo (JP)

(72) Inventors: Hiroyasu Kunimi, Kanagawa (JP); Kazuhide Sugiura, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/194,771

(22) Filed: Mar. 2, 2014

(65) Prior Publication Data
US 2015/0002705 A1 Jan. 1, 2015

(30) Foreign Application Priority Data
Jun. 27, 2013 (JP) ................. 2013-134988

(51) Int. Cl.
*H04N 9/64* (2006.01)
*H04N 5/361* (2011.01)

(52) U.S. Cl.
CPC ..................... *H04N 5/361* (2013.01)

(58) Field of Classification Search
CPC .... H04N 5/2176; H04N 5/2178; H04N 5/361
USPC ....................... 348/243, 241, 222.1
See application file for complete search history.

(56) References Cited

U.S. PATENT DOCUMENTS

| | | | | |
|---|---|---|---|---|
| 8,179,461 B2 * | 5/2012 | Suzuki et al. | ................. | 348/294 |
| 8,284,277 B2 * | 10/2012 | Nikai | ............................. | 348/245 |
| 8,451,350 B2 * | 5/2013 | Nozaki et al. | ................. | 348/243 |
| 2001/0005226 A1 * | 6/2001 | Muramatsu et al. | .......... | 348/304 |
| 2008/0218615 A1 * | 9/2008 | Huang et al. | ................... | 348/294 |
| 2008/0239111 A1 * | 10/2008 | Jiang | ............................. | 348/243 |
| 2008/0284889 A1 * | 11/2008 | Kinoshita | ....................... | 348/308 |
| 2010/0091144 A1 * | 4/2010 | Hidehiko et al. | ............. | 348/243 |
| 2011/0074986 A1 * | 3/2011 | Ogata | ............................ | 348/243 |
| 2012/0224086 A1 * | 9/2012 | Takita | ........................... | 348/243 |
| 2012/0314106 A1 * | 12/2012 | Kanemitsu et al. | ........... | 348/243 |

FOREIGN PATENT DOCUMENTS

| | | | |
|---|---|---|---|
| JP | H02137574 A | | 5/1990 |
| JP | 09-247552 A | | 9/1997 |
| JP | 2007006538 A | | 1/2007 |
| JP | 2008219593 A | | 9/2008 |
| JP | 2009077047 A | * | 4/2009 |
| JP | 2010-178384 A | | 8/2010 |

* cited by examiner

*Primary Examiner* — Sinh Tran
*Assistant Examiner* — Zhenzhen Wu
(74) *Attorney, Agent, or Firm* — Patterson & Sheridan, LLP

(57) ABSTRACT

An imaging sensor comprises a pixel array having an active imaging portion and a shielded portion. The active imaging portion provides an image signal corresponding to light incident on the pixel array. The shielded portion is shielded from the light incident on the pixel array and therefore provides a dark current signal. The imaging sensor includes a black-level adjustment circuit which adjusts the imaging signal to compensate for variations in the imaging signal black-level values. The black-level adjustment circuit includes an average value calculator to calculate an average signal value for each of a plurality of shielded regions in the shielded portion of the pixel array. A region selector is configured to select average signal values that are within a predetermined range. A black-level adjustment value calculator uses the selected values to calculate an adjustment value for the black-level of the image signal.

10 Claims, 5 Drawing Sheets

SOLID-STATE IMAGING DEVICE

CROSS-REFERENCE TO RELATED APPLICATION

This application is based upon and claims the benefit of priority from Japanese Patent Application No. 2013-134988, filed Jun. 27, 2013, the entire contents of which are incorporated herein by reference.

FIELD

Embodiments described herein relate to a solid-state imaging device.

BACKGROUND

Conventionally, solid-state imaging devices may include an imaging region of which a portion is purposively shielded from incident light. That is, the imaging region may have a portion that is shielded by an opaque material which prevents light from reaching imaging sensors below. This shielded portion of the imaging region may be referred to as an optical black (OB) portion. In this OB portion there is no photoelectric conversion of incident light, but the OB portion still generates a dark current (OB signal), due to, for example thermal energy and other random fluctuations in the shielded imaging sensors. A black-level of an image signal can be adjusted in accordance the OB signal from the OB portion. Since there is a dark current generated in the imaging sensor, an offset voltage is superposed on the image signal from the active imaging area pixels. Thus, the solid-state imaging device performs a black-level adjustment to the image signal by subtracting the voltage output by the OB portion from the output of the active imaging area (active pixel portion). The active imaging area is the portion of the imaging region that is not purposively shielded from light and generates the imaging signal in response to incident light.

By using an arithmetic mean of outputs from a plurality of shielded pixels to generate the OB signal, the effect of image noise can be reduced in the final image signal. But when a high-intensity incident light such as a spot light is incident on at least a portion of the imaging region, a charge generated by photoelectric conversion in the active imaging area may leak into the OB portion (which is generally adjacent to active imaging area) causing the level of the OB signal to change in a manner that does not reflect the dark noise generated in the imaging sensor, but rather reflects current leakage from the active area. In this instance, the OB signal may become large, resulting in a putative correction to the imaging signal which will needlessly reduce the brightness of the whole image and thus degrade the quality of the image signal output by the imaging sensor.

DETAILED DESCRIPTION

According to an embodiment, there is provided a solid-state imaging device which can acquire a high-quality image by performing a black-level adjustment such that the influence exerted by an incident light is suppressed.

In an embodiment, an imaging sensor includes a pixel array having an active imaging portion and a light-shielded (shielded) portion. The active imaging portion includes active pixels (e.g., photodiodes) and provides an image signal (first signal) corresponding to the light incident on the pixel array. The shielded portion is shielded from the light incident on the pixel array and therefore provides a signal (second signal) generally corresponding to a dark current level.

The imaging sensor includes a black-level adjustment circuit which adjusts the imaging signal to compensate for variations in the imaging signal black-level values. The black-level adjustment circuit includes an average value calculator to calculate an average signal value for each of a plurality of shielded regions in the shielded portion of the pixel array. A region selector in the black-level adjustment circuit is configured to select average signal values that are within a predetermined range. For example, the region selector may exclude an average signal value from region when the average signal value exceeds a predetermined threshold value. A black-level adjustment value calculator in the black-level adjustment circuit uses the selected average values to calculate an adjustment value for the black-level of the image signal. A clamp processing module may be included to "clamp" (e.g., set a minimum signal value) the image signal to the black-level adjustment value or a level corresponding to the black-level adjustment value.

Hereinafter, a solid-state imaging device according to embodiments is explained in detail in conjunction with attached drawings. The present disclosure is not limited by the embodiments.

First Embodiment

Figure 1:
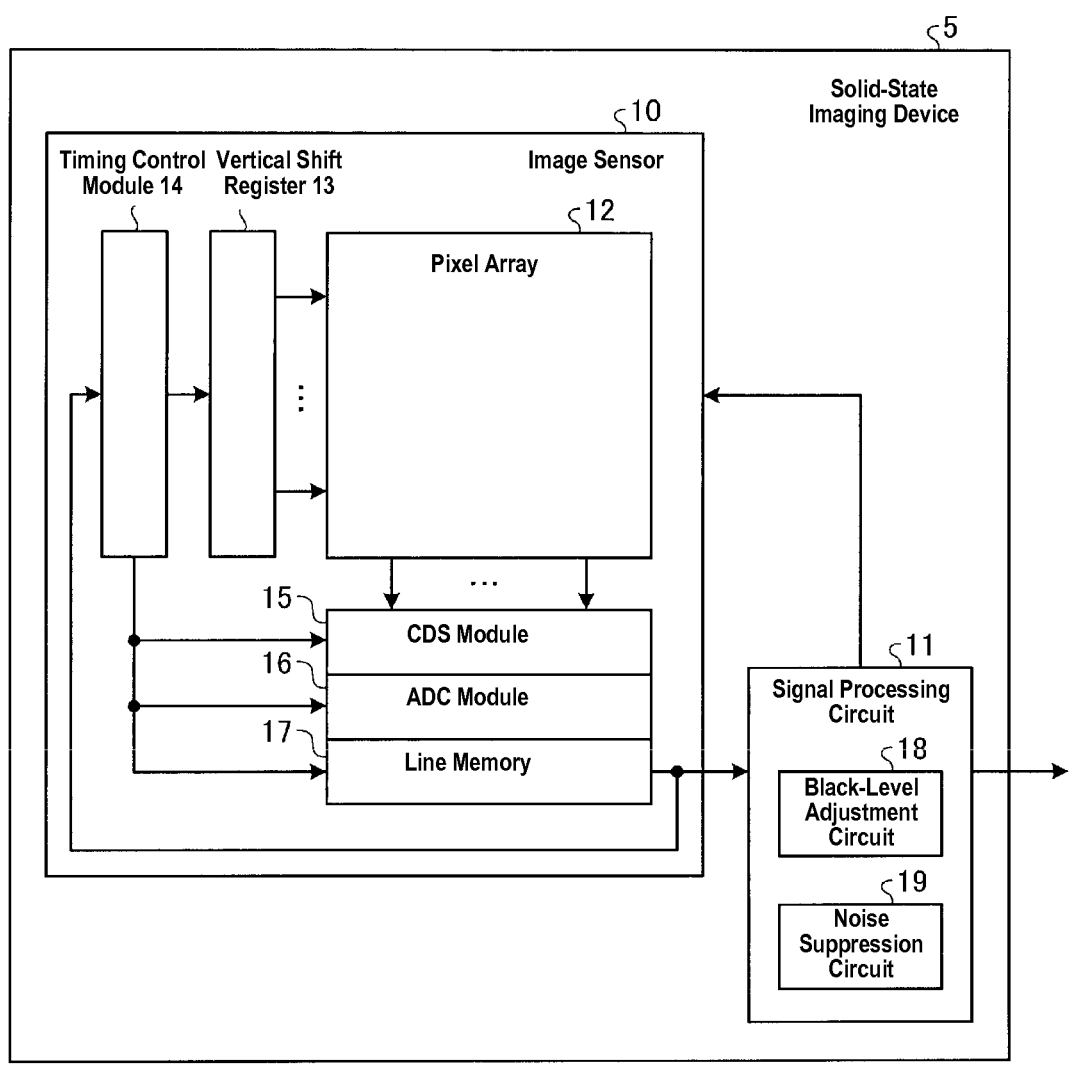
FIG. 1 is a block diagram of a solid-state imaging device according to a first embodiment.
Figure 2:
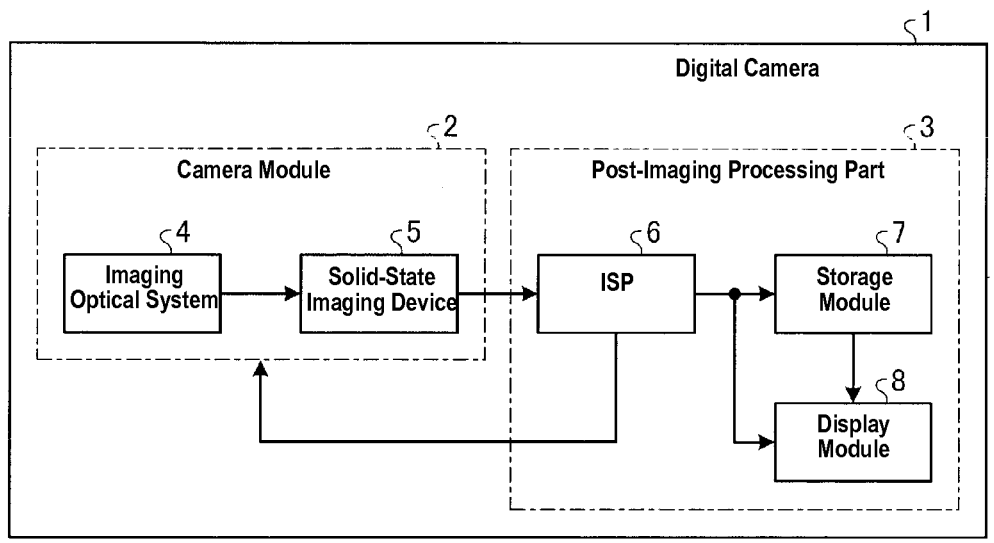
FIG. 2 is a block diagram of a digital camera including the solid-state imaging device depicted in FIG. 1.

FIG. 1 is a block diagram of a solid-state imaging device according to a first embodiment. FIG. 2 is a block diagram of a digital camera provided with the solid-state imaging device depicted in FIG. 1.

As depicted in FIG. 2, digital camera 1 includes a camera module 2 and a post-imaging processing module 3. The camera module 2 includes an imaging optical system 4 and a solid-state imaging device 5. The post-imaging processing part 3 includes an image signal processor (ISP) 6, a storage module 7 and a display module 8. The camera module 2 may also be incorporated in other electronic equipment such as a personal digital assistant, tablet device, or cell phone provided with a camera, for example, besides the digital camera 1.

The imaging optical system 4 receives light from a subject therein and forms a subject image. The solid-state imaging device 5 captures the subject image. The ISP 6 performs signal processing on an image signal obtained by imaging using the solid-state imaging device 5. The storage module 7 stores an image after the image signal has been processed in the IPS 6. The storage module 7 outputs an image signal to a display module 8 in response to the manipulation by a user or the like. The display module 8 displays an image provided in an image signal from the ISP 6 or the storage module 7. The display module 8 is a liquid crystal display, for example.

The digital camera 1 performs a feedback control of the camera module 2 based on data which has already been subjected to signal processing in the ISP 6.

As depicted in FIG. 1, the solid-state imaging device 5 includes an image sensor 10 (imaging element) and a signal processing circuit 11 (image processing device). The image sensor 10 is a CMOS (complementary metal oxide semiconductor) image sensor, for example. The image sensor 10 may be also a charge-coupled device (CCD) besides the CMOS image sensor.

The image sensor 10 includes a pixel array 12, a vertical shift register 13, a timing control module 14, a correlation double sampling (CDS) module 15, an analog-digital conversion (ADC) module 16, and a line memory 17.

The pixel array 12 is arranged in an imaging region of the image sensor 10. The pixel array 12 is formed of a plurality of pixels which are arranged in an array in the horizontal direction (row direction) as well as in the vertical direction (column direction). Each pixel includes a photodiode as a photoelectric conversion element. The pixel array 12 generates signal corresponding to the incident light on the respective pixels of the array.

The timing control module 14 supplies a vertical synchronizing signal used to coordinate the reading of a signal from each pixel in the pixel array 12 to the vertical shift register 13. The timing control module 14 supplies a timing signal which indicates drive timing to the CDS 15, the ADC 16 and the line memory 17 respectively.

The vertical shift register 13 selects pixels in the pixel array 12 by row in response to a vertical synchronizing signal from the timing control module 14. The vertical shift register 13 outputs a readout signal to the respective pixels on the selected row. The pixels to which the readout signal is inputted, output a signal charge stored therein corresponding to the amount of light incident on the pixel. The pixel array 12 outputs a signal transmitted from the pixels to the CDS 15 via a vertical signal line.

The CDS 15 performs correlation double sampling processing to reduce fixed pattern noise in the signal from the pixel array 12. In this context, fixed pattern noise refers to pixel signal deviations that are approximately constant between different images.

The ADC 16 converts an analog signal from the pixel array 12 into a digital signal.

The line memory 17 stores signals from the ADC 16.

The image sensor 10 outputs the signal stored in the line memory 17.

The signal processing circuit 11 performs various signal processing on image signals from the image sensor 10. The signal processing circuit 11 includes a black-level adjustment circuit 18 and a noise suppression circuit 19. The black-level adjustment circuit 18 performs black-level adjustment on image signals. The noise suppression circuit 19 performs noise suppression processing on image signals.

The signal processing circuit 11 executes signal processings such as lens shading correction, lens flaw correction, and white balance adjustment, for example, besides black-level adjustment executed by the black-level adjustment circuit 18 and noise suppression processing executed by the noise suppression circuit 19.

The solid-state imaging device 5 outputs an image signal which has been subjected to signal processing in the signal processing circuit 11. The solid-state imaging device 5 executes feedback control of the image sensor 10 based on the processed image data from signal processing circuit 11.

The image sensor 10 executes the black-level adjustment in accordance with the feedback control. The solid-state imaging device 5 executes the black-level adjustment in two stages in the image sensor 10 and in the black-level adjustment circuit 18.

Figure 3:
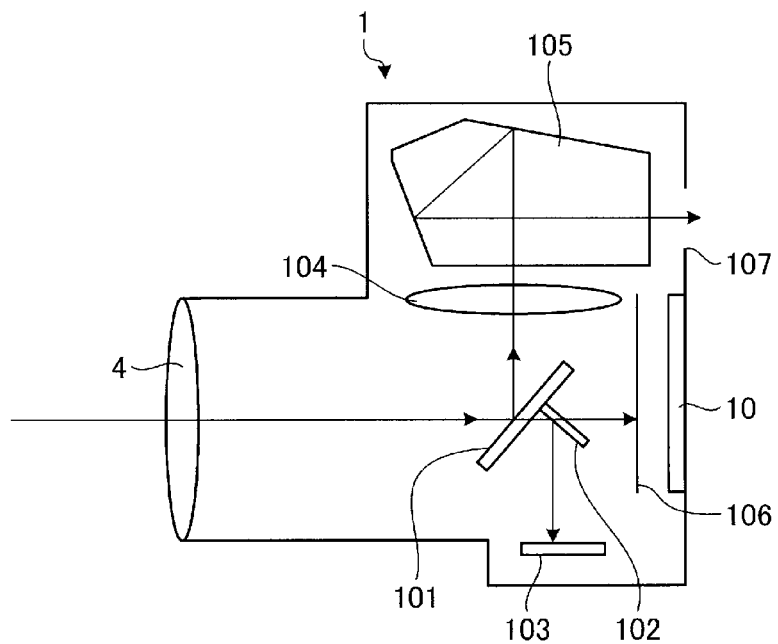
FIG. 3 depicts an optical system in a digital camera.

FIG. 3 is a view depicting an optical system in a digital cameral. A first portion of the light incident on the imaging optical system 4 advances to the image sensor 10 through a main mirror 101, a sub-mirror 102, and a mechanical shutter 106. The digital camera 1 captures an image of the subject using the image sensor 10.

A second portion of the light incident on the imaging optical system 4 is reflected by sub-mirror 102 to an auto focus (AF) sensor 103. The digital camera 1 performs the focus adjustment by using a detection result acquired by the AF sensor 103.

A third portion of the light incident on the imaging optical system 4 is reflected by the main mirror 101 to a viewfinder 107 through a lens 104 and a prism 105.

Figure 4:
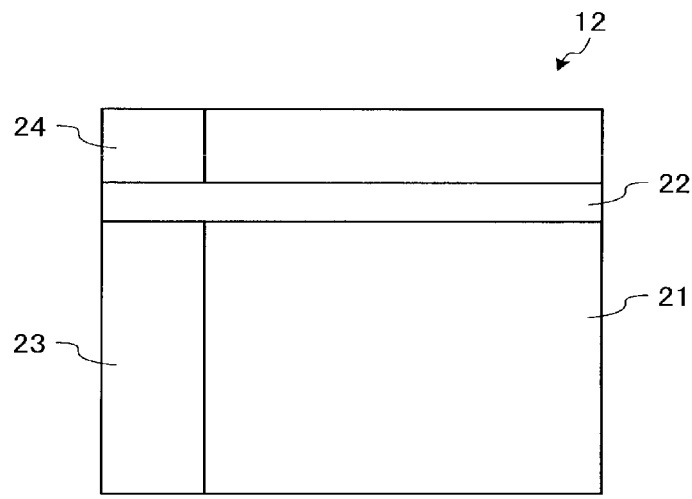
FIG. 4 is a schematic plan view depicting an active pixel region and an optical black (OB) region in a pixel array.

FIG. 4 is a schematic plan view depicting an active pixel portion and an optical black (OB) portion in a pixel array. The pixel array 12 includes an OB portion including a first OB portion 22 and a second OB portion 23. Pixel array 12 also includes a feedback clamp (FBC) portion 24 and an active pixel portion 21.

The active pixel portion 21 includes pixels that convert incident light to electrical energy with a photoelectric conversion element. The active pixel portion 21 outputs an active pixel signal corresponding to intensity of light incident on the photoelectric conversion element.

The OB portion comprises a pixel (or a plurality of pixels) where the photoelectric conversion element is shielded from light by a light shielding member such as an aluminum member. The OB portion outputs an OB signal from the photoelectric conversion element in a light shielded state. The second OB portion 23 is arranged adjacent to the active pixel portion 21. The first OB portion 22 is arranged adjacent to active pixel portion 21 and crossing the second OB portion 23.

In FIG. 4, first OB portion 23 extends in the left-right direction of the page and the second OB portion extends in the top-bottom direction of the page.

As depicted in FIG. 4, the FBC portion 24 is positioned in the same range (left-right position in FIG. 4) as the second OB portion 23 and is above the first OB portion 22 in the vertical direction (top-bottom page direction of FIG. 4). Thus, in FIG. 4 the FBC portion 24 is positioned in the upper left corner of pixel array 12, first OB region 22 extends across pixel array 12 in the left-right page direction, and second OB portion 23 is located on the left side of pixel array 12 and below FBC portion 24.

The timing control module 14 executes a feedback control of a clamp voltage from the ADC 16 until an OB signal read from the FBC portion 24 converges to a predetermined black-level.

The noise suppression circuit 19 executes noise suppression processing with respect to an active pixel signal based on an OB signal read from the second OB portion 23. The noise suppression circuit 19 reduces noises caused by a change in a dark current following a change in condition such as temperature, and noises caused by a change in low frequency following a change in power source.

The black-level adjustment circuit 18 adjusts a black-level of an active pixel signal for every frame based on an OB signal read from the first OB portion 22.

Figure 5:
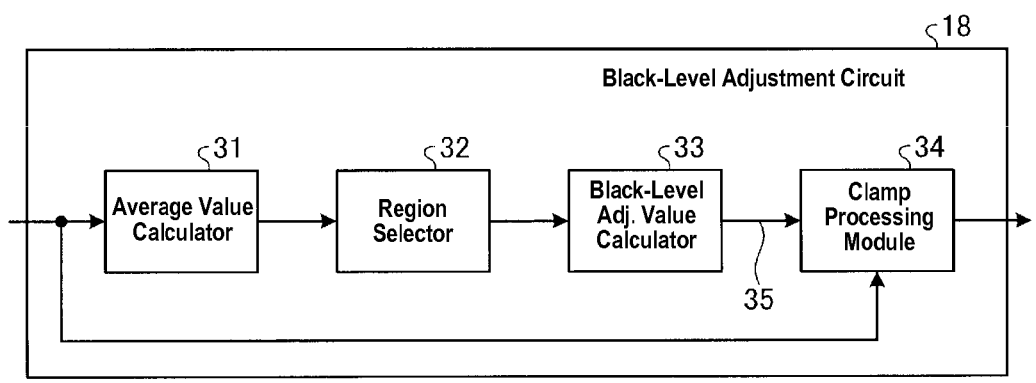
FIG. 5 is a block diagram of a black-level adjustment circuit.

FIG. 5 is a block diagram of the black-level adjustment circuit 18. The black-level adjustment circuit 18 includes an average value calculator 31, a region selector 32, a black-level adjustment value calculator 33, and a clamp processing module 34.

The average value calculator 31 calculates an average value of OB signals from OB signals from a plurality regions that are formed by dividing the first OB portion 22 into different regions. The region selector 32 selects those regions where the average signal value is within a predetermined range. The black-level adjustment value calculator 33 calculates a black-level adjustment value 35 by using the average value calculated in the average value calculation module 31.

The clamp processing module 34 executes clamp processing of an active pixel signal based on the black-level adjustment value 35. The black-level adjustment circuit 18 outputs a signal which has been subjected to clamp processing in the clamp processing module 34.

Figure 6:
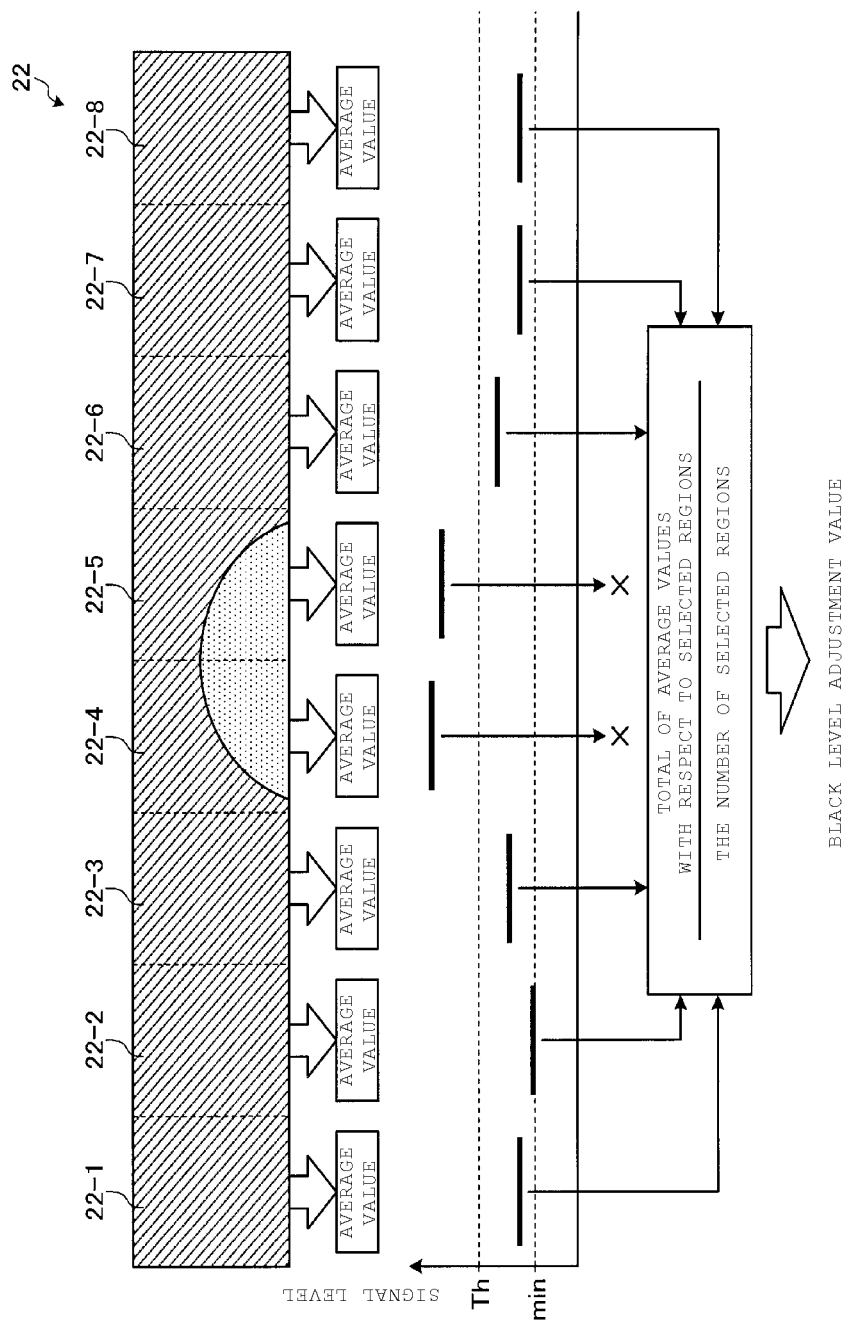
FIG. 6 depicts a process occurring before a black-level adjustment value is calculated in the black-level adjustment circuit.

FIG. 6 is a view for explaining the steps until a black-level adjustment value is calculated in the black-level adjustment circuit. Assume that the first OB portion 22 is divided into eight regions 22-1 to 22-8, for example. The average value calculator 31 integrates OB signals from each respective region 22-1 to 22-8. After finishing the integration of the OB signals from all pixels for the respective regions 22-1 to 22-8, the average value calculator 31 divides the integrated result by the number of pixels, thus acquiring average pixel values for each respective region 22-1 to 22-8. The black-level adjustment circuit 18 stores these average values in a register, for example.

The region selector 32 compares each average value calculated in the average value calculator 31 to a threshold value Th. The threshold value Th is set in advance as an upper limit of a signal level range that will be in the black-level adjustment process. That is, the threshold value Th is used as a region selection criterion. The black-level adjustment circuit 18 holds the threshold value Th in a register, for example. A lowermost value (min) of an OB signal is set as a lower limit of the signal level range.

The region selector 32 excludes regions where the average value exceeds the threshold value Th from by comparing each average value with the threshold value Th. The region selector 32 selects regions where the average value does not exceed the threshold value Th as the regions used in for calculating a black-level adjustment value 35. The threshold value Th is not limited to a fixed value, and may change in a correlated manner with an analog gain or an exposure time.

For example, assuming that a charge leaks into the two regions 22-4, 22-5 from the active pixel portion 21 due to the incidence of a locally strong light on pixel portion 21. In this case, an OB signal inputted to the black-level adjustment circuit 18 from these two regions 22-4, 22-5 would include an OB signal where the signal level has become excessively high due to such a charge. A black-level adjustment value calculated using these high signal levels would not correctly reflect the appropriate black-level signal. But in this embodiment, the respective average values obtained from these two regions 22-4, 22-5 would exceed the threshold Th value.

When both of the respective average values obtained with respect to two regions 22-4, 22-5 are larger than the threshold value Th, the region selector 32 excludes these two regions 22-4, 22-5 from objects to be selected. Accordingly, the region selector 32 selects the six regions 22-1 to 22-3, 22-6 to 22-8 where the average value is equal to or below the threshold value Th. The region selector 32 replaces the average values which the register holds with zero with respect to the excluded regions, for example.

The black-level adjustment value calculator 33 obtains a total of the average values with respect to the regions selected by the region selector 32. For example, the black-level adjustment value calculator 33 obtains the total by summing up the average values which the register holds with respect to the respective regions. The black-level adjustment value calculator 33 divides such a total by the number of regions selected by the region selector 32. Due to such an operation, the black-level adjustment value calculator 33 obtains an average value of OB signals from the region selected by the region selector 32 in the first OB portion 22, and sets this average value as a black-level adjustment value 35.

When six regions 22-1 to 22-3, 22-6 to 22-8 are selected by the region selector 32, the black-level adjustment value calculator 33 sets a value obtained by dividing a sum total of average values with respect to these six regions 22-1 to 22-3, 22-6 to 22-8 by 6 as a black-level adjustment value 35. The black-level adjustment circuit 18 holds the black-level adjustment value 35 calculated by the black-level adjustment calculator 33 in the register, for example.

The clamp processing part 34 subtracts the black-level adjustment value 35 from a value of an active pixel signal. Accordingly, the clamp processing part 34 clamps a level of the active pixel signal at the black-level adjustment value 35.

According to the first embodiment, the black-level adjustment circuit 18 calculates a black-level adjustment value 35 based on an OB signal from a region of the OB portion selected by the region selector 32. With the use of such a black-level adjustment value 35, even when a charge leaks to the first OB portion 22 from the active pixel portion 21 due to a strong incident light, the solid-state imaging device 5 can properly adjust a black-level of an active pixel signal. Accordingly, the solid-state imaging device 5 acquires an advantageous effect that a high-quality image can still be acquired with the proper black-level adjustment which thus suppresses the influence exerted by the strong incident light.

The average value calculator 31 is not limited to an average value calculator which calculates an average value from the first OB portion 22 that is divided into eight regions. The number of regions in the first OB portion 22 is not specifically limited provided that the number of the regions is two or more. The shapes and areas of the respective regions of the first OB portion 22 may be set to be equal to each other or may be suitably set to be different from each other.

Second Embodiment

Figure 7:
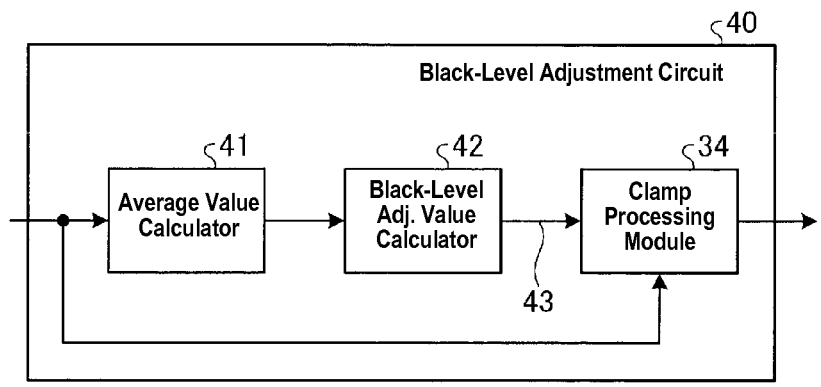
FIG. 7 is a block diagram of a black-level adjustment circuit in a solid-state imaging device according to a second embodiment.

FIG. 7 is a block diagram of a black-level adjustment circuit of a solid-state imaging device according to a second embodiment.

Figure 8:
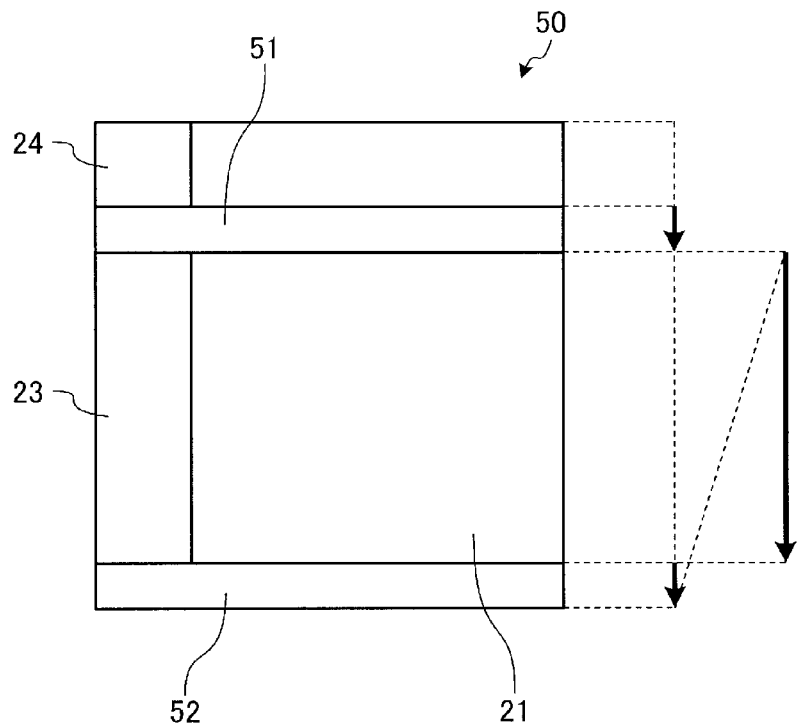
FIG. 8 is a schematic plan view showing an active imaging area and optical black (OB) regions in a pixel array according to the second embodiment.

FIG. 8 is a schematic plan view showing an active pixel portion and an OB portion in a pixel array. A black-level adjustment circuit 40 of this embodiment is provided instead of the black-level adjustment circuit 18 in the solid-state imaging device 5 according to the first embodiment. Those parts which are identical or substantially similar to the corresponding parts in the first embodiment are given the same reference symbols, and the explanation of these parts may be omitted when appropriate.

A pixel array 50 includes a first OB portion 51, a third OB portion 52 and a second OB portion 23, a feedback clamp (FBC) portion 24, and an active pixel portion 21.

In FIG. 8, the first OB portion 51 is positioned above (in the top-bottom page direction) the active pixel portion 21 and the second OB portion 23. The third OB portion 52 is positioned below (that is, more towards the bottom of the page in FIG. 8) the active pixel portion 21 and the second OB portion 23. The first OB portion 51 and the third OB portion 52 are arranged parallel to each other with the active pixel portion 21 sandwiched therebetween.

The black-level adjustment circuit 40 adjusts a black-level of an active pixel signal for every frame based on at least one of an OB signal read from the first OB portion 51 and an OB signal read from the third OB portion 52.

The black-level adjustment circuit 40 includes an average value calculator 41, a black-level adjustment value calculator 42, and a clamp processing part 34.

The average value calculator 41 calculates a respective average value of OB signals from the first OB portion 51 and the third OB portion 52. The average value calculator 41 integrates the OB signals from pixels in the first OB portion 51 and the third OB portion 52, respectively. The average value calculator 41 obtains an average value with respect to the first OB portion 51 and an average value with respect to the third OB portion 52 by dividing a result of integration of OB signals by the number of pixels that were used in the integration.

The black-level adjustment value calculator 42 compares the average value obtained by the average value calculator 41 for the first OB portion 51 and the average value obtained by the average value calculator 41 for the third OB portion 52. The black-level adjustment value calculator 42 selects the smaller of the average values from the first OB portion 51 and the third OB portion 52 as a black-level adjustment value 43.

The clamp processing part 34 executes clamp processing of an active pixel signal based on the black-level adjustment value 43 from the black-level adjustment value calculator 42. The black-level adjustment circuit 40 outputs a signal which has been subjected to clamp processing in the clamp processing part 34.

For example, assume that a signal level of an OB signal becomes excessively large with respect to the whole first OB portion 51 due to a strong incident light incident on the active pixel portion 21. In this case, an average value for the first OB portion 51 becomes larger than an average value for the third OB portion 52 and hence, the black-level adjustment value calculator 42 selects the average value from the third OB portion 52 as a black-level adjustment value 43.

Arrows shown in FIG. 8 indicate the order of reading OB signals from the first OB portion 51 and the third OB portion 52 and an active pixel signal from the active pixel portion 21.

The black-level adjustment circuit 40 adjusts a black-level of the active pixel signal based on the respective signals read in the order of the OB signal from the first OB portion 51, the OB signal from the third OB portion 52 and the active pixel signal from the active pixel portion 21. Accordingly, the black-level adjustment circuit 40 can adjust a black-level of the active pixel signal based on the OB signals read immediately before the active pixel signal.

Further, the image sensor 10 may read respective signals in the order of an OB signal from the first OB portion 51, an active pixel signal from the active pixel portion 21 and an OB signal from the third OB portion 52. When the respective signals are sequentially read from an upper side in the vertical direction (as depicted in FIG. 8) in this manner, the solid-state imaging device 5 may hold the active pixel signal until the OB signal from the third OB portion 52 is read. Accordingly, the black-level adjustment circuit 40 can adjust a black-level of an active pixel signal based on an OB signal read immediately before or immediately after the active pixel signal.

According to the second embodiment, the black-level adjustment circuit 40 adopts the smaller of the average values from the first OB portion 51 and the third OB portion 52 as a black-level adjustment value 43. By adjusting an active pixel signal by using such a black-level adjustment value 43, the solid-state imaging device 5 can properly adjust the black-level of the active pixel signal even when a charge leaks into either an upper portion or a lower portion of the active pixel portion 21 due to a strong incident light.

Even under a circumstance where a signal level of an OB signal is excessively high for all regions of the of the first OB portion 51 or the third OB portion 52, the black-level adjustment circuit 40 can execute the black-level adjustment based on an OB signal if one of the first and second OB portions does provides an OB signal at a level within an acceptable range (not excessively high). Accordingly, the solid-state imaging device 5 has the advantageous effect that a high-quality image can be acquired using a proper black-level adjustment even when high intensity light is incident on portions of the pixel array 50.

The black-level adjustment circuit 40 may supply the lower of the average value from the first OB portion 51 and the average value from the third OB portion 52 as the black-level adjustment value 43 provided the value falls within a predetermined level range.

For example, the black-level adjustment value calculator 42 further compares the lower of the average value from the first OB portion 51 and third OB portion 52 to a predetermined threshold value. The black-level adjustment value calculator 42 may use the threshold value as the black-level adjustment value 43 when the average values do not exceed the threshold value. Accordingly, the solid-state imaging device 5 can prevent the brightness of the whole screen from being lowered due to an excessively large black-level adjustment value 43.

In the second embodiment, in a similar manner as in the first embodiment with respect to first OB vertical portion 22, the first OB portion 51 and the third OB portion 52 may be each divided into a plurality of regions. In this case, the black-level adjustment circuit 40 includes a region selector 32 (see FIG. 5) in addition to the elements depicted in FIG. 7.

The average value calculator 41 calculates an average value of an OB signal for each of the first OB portion 51 and the third OB portion 52. The average value calculator 41 further calculates an average value for each divided region of the first OB portion and third OB portion 52. The region selector 32 selects regions where the average value falls within a level range set in advance out of a plurality of regions.

The black-level adjustment value calculator 42 obtains a total of average values with respect to the regions selected by the region selector 32. The black-level adjustment value calculator 42 obtains an average value of the OB signals from the regions selected by the region selector 32, and sets this average value as a black-level adjustment value 43. In this manner, the black-level adjustment value calculator 42 calculates the black-level adjustment value 43 based on the lower average value of the OB signal from the first OB portion 51 or the average value of the OB signal from the third OB portion 52.

Also in this case, the black-level adjustment circuit 40 can execute the proper adjustment even under a circumstance where an OB signal becomes excessively large over the whole range of one of the first OB portion 51 and the third OB portion 52. Further, the black-level adjustment circuit 40 can execute the black-level adjustment where the influence exerted by a locally incident light is suppressed by calculating the black-level adjustment value 43 by selecting the region using the region selector 32.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An imaging sensor, comprising:
   a pixel array including:
      an active imaging portion configured to output a first signal corresponding to an amount of light incident on the pixel array, and
      a first shielded portion comprising a plurality of first shielded regions, the first shielded portion being shielded from light incident on the pixel array and configured to output a second signal; and
   a black-level adjustment circuit configured to adjust the first signal, comprising:
      an average value calculator configured to calculate an average signal value for each of the first shielded regions,
      a region selector configured to select average signal values that are within a predetermined range, and
      a black-level adjustment value calculator configured to calculate a black-level adjustment value by using average signal values selected by the region selector,
   wherein the pixel array further includes a second shielded portion that is shielded from light incident on the pixel array and is configured to provide a third signal that is supplied to a noise suppression circuit configured to adjust the first signal,
   wherein the pixel array further includes a third shielded portion that is shielded from light incident on the pixel array, comprises a plurality of third shielded regions, and is configured to provide a fourth signal, and
   wherein the average value calculator is further configured to:
   calculate the average signal value for each third shielded region,
   calculate a first region average value for the first shielded portion using the average signal values for each of the first shielded regions, and
   calculate a second region average value for the third shielded portion using the average signal values for each of the third shielded regions; and
   the region selector is further configured to select average signal values from the first shielded portion when the first region average value is less than the second region average value and to select average signal values from the third shielded portion when the second region average value is less than the first region average value.

2. The imaging sensor of claim 1, further comprising:
   a clamp processing module configured to adjust the first signal to have a minimum value corresponding to the black-level adjustment value.

3. The imaging sensor of claim 1, wherein the region selector is configured to select only average signal values that are less than a predetermined threshold value.

4. The imaging sensor of claim 1, wherein the average value calculator is configured to calculate the average signal value of a region by receiving a pixel signal from each pixel in the region, summing the received pixel signals, and then dividing the summed pixel signal by the number of pixels in the region.

5. The imaging sensor of claim 1, wherein each pixel in the pixel array comprises a photodiode.

6. A solid-state imaging device including a black-level adjustment circuit for adjusting a black-level of an imaging signal from an imaging sensor by using signals from portions of the imaging sensor that are shielded from incident light, the black-level adjustment circuit comprising:
   an average value calculator which calculates a first average value of pixel signals from a first shielded portion of a pixel array and a second average value of pixel signals from a second shielded portion of the pixel array, the first and second shielded portions being arranged parallel to each other with an active pixel portion sandwiched therebetween;
   a black-level adjustment value calculator which is configured to set a black-level adjustment value to be a lesser of the first average and the second average value; and
   a clamp processing module which sets a minimum value of an active pixel signal from the active pixel portion based on the black-level adjustment value.

7. The solid-state imaging device according to claim 6, wherein the black-level adjustment circuit is configured to read the pixels signals from the first shielded portion, then the active pixel signal, and then the pixel signals from the second shield portion.

8. The solid-state imaging device of claim 6, wherein the pixel array comprises a charge-coupled device array.

9. An imaging device, comprising:
   a pixel array including:
      an active imaging portion configured to output a first signal corresponding to an amount of light incident on the pixel array,
      a first shielded portion comprising a plurality of first shielded regions, the first shielded portion being shielded from light incident on the pixel array and configured to output a second signal, and
      a second shielded portion shielded from light incident on the pixel array and configured to output a third signal; and
   a black-level adjustment circuit configured to adjust the first signal, comprising:
      an average value calculator configured to calculate an average signal value for each of the first shielded regions,
      a region selector configured to select average signal values that are within a predetermined range,
      a black-level adjustment value calculator configured to calculate a black-level adjustment value by using average signal values selected by the region selector, and
      a clamp processing module configured to adjust the first signal to have a minimum value corresponding to the black-level adjustment value, wherein
   the second shielded portion is parallel to the first shielded portion,
   the average value calculation calculator calculates a first average value of pixel signals from the first shielded portion and a second average value of pixel signals from the second shielded portion, and the black-level adjustment value calculator is configured to set the black-level adjustment value to be a lesser of the first average value and the second average value.

10. The imaging device of claim 9, wherein second shielded portion comprises a plurality of second shielded regions, and the average value calculator is configured calculate an average signal value for each of the second shielded regions.

* * * * *